United States Patent
Gugino, II

(10) Patent No.: US 12,229,144 B2
(45) Date of Patent: Feb. 18, 2025

(54) PLATFORM AND SERVICE DISRUPTION AVOIDANCE USING DEPLOYMENT METADATA

(71) Applicant: Red Hat, Inc., Raleigh, NC (US)

(72) Inventor: Michael Philip Gugino, II, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 67 days.

(21) Appl. No.: 17/035,083

(22) Filed: Sep. 28, 2020

(65) Prior Publication Data
US 2022/0100766 A1    Mar. 31, 2022

(51) Int. Cl.
| | |
|---|---|
| G06F 16/245 | (2019.01) |
| G06F 8/60 | (2018.01) |
| G06F 8/61 | (2018.01) |
| G06F 9/50 | (2006.01) |
| G06F 9/54 | (2006.01) |
| G06F 16/2455 | (2019.01) |

(Continued)

(52) U.S. Cl.
CPC .......... *G06F 16/24564* (2019.01); *G06F 8/61* (2013.01); *G06F 9/541* (2013.01); *G06F 16/24573* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 2008/0083034 A1* | 4/2008 | Kim | H04L 63/1433 726/25 |
| 2017/0315796 A1* | 11/2017 | Melnik | G06F 8/60 |
| 2019/0243621 A1* | 8/2019 | Gass | G06F 8/65 |

(Continued)

FOREIGN PATENT DOCUMENTS

CN   110531988   12/2019

OTHER PUBLICATIONS

Andrija Volkanovski; Applications of the fault tree analysis for assessment of power system reliability; Elsevier; pp. 1116-1127 (Year: 2009).*

(Continued)

*Primary Examiner* — Albert M Phillips, III
*Assistant Examiner* — Jermaine A Mincey
(74) *Attorney, Agent, or Firm* — Kilpatrick Townsend & Stockton LLP

(57) ABSTRACT

A system includes a cluster, memory, and processors in communication with the memory. The cluster includes nodes and an application programming interface (API) server. The processor is configured to receive a request to determine a state of maintenance availability of the cluster. Each of the plurality of applications installed on the cluster are discoverable, and a deployment metadata associated with each of the plurality of applications is retrieved. The deployment metadata for each of the plurality of applications is parsed to retrieve one or more installation rules associated with each of the plurality of applications. The one or more installation rules associated with a first application of the plurality of applications is correlated with the one or more installation rules of the plurality of applications to determine a set of conflicts for the first application. Next, a state of maintenance availability is determined based on the set of conflicts.

16 Claims, 7 Drawing Sheets

(51) Int. Cl.
*G06F 16/2457* (2019.01)
*G06F 16/28* (2019.01)

(56) References Cited

U.S. PATENT DOCUMENTS

| | | | |
|---|---|---|---|
| 2020/0034193 A1* | 1/2020 | Jayaram | G06F 3/0644 |
| 2020/0133651 A1* | 4/2020 | Holzer | G06F 8/65 |
| 2020/0184367 A1* | 6/2020 | Shivamoggi | G06N 20/00 |
| 2020/0250002 A1* | 8/2020 | Gururaj | G06F 9/5027 |

OTHER PUBLICATIONS

Pollack, "Using SQL Server Database Metrics to Predict Application Problems", SQLShack, https://www.sqlshack.com/using-database-metrics-to-predict-application-problems/; Sep. 27, 2019; Accessed on or before Sep. 28, 2020; (10 pages).

Robinson, "Afi touts resilience and replication for K8s container workloads", https://blocksandfiles.com/2020/07/07/afi-data-platform-kubernetes/; Jul. 7, 2020; Accessed on or before Sep. 28, 2020 (2 pages).

Srinivas, "Automating Kubernetes workload security reporting", https://snyk.io/blog/automating-kubernetes-workload-security-reporting/; Mar. 2, 2020; Accessed on or before Sep. 28, 2020 (7 pages).

* cited by examiner

PLATFORM AND SERVICE DISRUPTION AVOIDANCE USING DEPLOYMENT METADATA

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices. Maintenance and/or modifications to installed service and/or applications may often be applied in various server or cloud environments which may be continuously evolving.

SUMMARY

The present disclosure provides new and innovative systems and methods for analyzing deployment metadata to avoid platform and service disruptions. In an example, a system includes a cluster, memory, and one or more processors. The one or more processors are in communication with the memory and the cluster includes one or more nodes and an application programming interface (API) server. The processor is configured to receive a request to determine a state of maintenance availability of the cluster, where a plurality of applications are installed on the cluster. Each of the plurality of applications installed on the cluster are discovered. A deployment metadata associated with each of the plurality of applications is retrieved. The deployment metadata for each of the plurality of applications is parsed to retrieve one or more installation rules associated with each of the plurality of applications. The one or more installation rules associated with a first application of the plurality of applications is correlated with the one or more installation rules of the plurality of applications to determine a set of conflicts for the first application, where each conflict of the set of conflicts for the first application is associated with a potential disruption related to the first application. Next, a state of maintenance availability is determined based on the set of conflicts.

In an example, a method includes receiving a request to determine a state of maintenance availability of a cluster, wherein a plurality of applications are installed on the cluster. Each of the plurality of applications installed on the cluster are discovered and a deployment metadata associated with each of the plurality of applications are retrieved. The deployment metadata for each of the plurality of applications are parsed to retrieve one or more installation rules associated with each of the plurality of applications. The one or more installation rules associated with a first application of the plurality of applications are correlated with the one or more installation rules of the plurality of applications to determine a set of conflicts for the first application, where each conflict of the set of conflicts for the first application is associated with a potential disruption related to the first application. Next, a state of maintenance availability is determined based on the set of conflicts.

In an example, a system includes a memory and one or more processors, where the one or more processors are in communication with the memory. The processor is configured to receive a request to assess an installation of an application deployed within a cluster. Next, a deployment metadata associated with the application is retrieved and a database including one or more model installation rules associated with a model installation of the application is accessed. The deployment metadata is parsed to retrieve one or more installation rules for the application. The one or more installation rules for the application is compared with the one or more installation rules associated with the model installation of the application to determine a set of differences between the application and the model installation of the application. Subsequently, a state of deployment based on the set of differences is determined.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
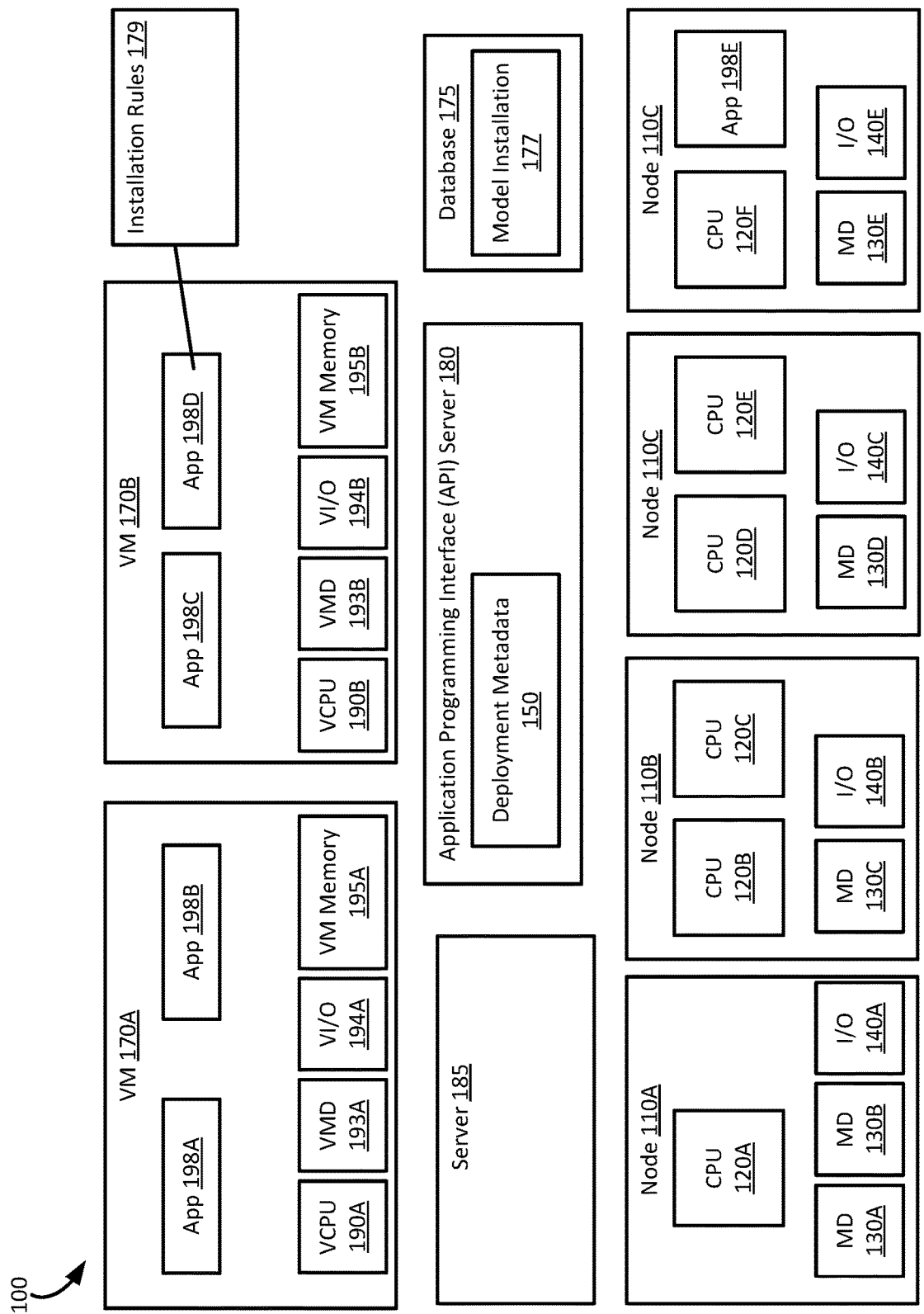
FIG. 1 illustrates a high level component diagram of an example computing system in accordance with one or more aspects of the present disclosure.

Techniques are disclosed for implementing systems and method for avoiding platform and service disruption and/or downtime based on deployment metadata. Typically, application platforms, such as OpenShift and Kubernetes allow for deployment of various services and applications from various sources onto a shared platform. Generally, maintaining and administering the services and applications on the shared platform can be difficult because there is not a single tool, interface, and/or common implementation to assist with identifying deployed applications and services, which may be disrupted due to platform maintenance and/or outages. Typically, administration of a shared platform is a manual process where each application or service requires individual attention and/or analysis to determine whether one or more applications are vulnerable to potential disruptions related to each application's deployment within the shared platform.

As described in various examples disclosed herein, to advance the automation and/or administration of shared platforms and avoid disruptions to platforms and services, the systems and methods disclosed herein advantageously implement a deployment metadata analysis tool. The deployment metadata analysis tool is operable to discover existing services and/or applications deployed on a platform, retrieve relevant metadata, analyze the relevant metadata to assess an application's, ability to withstand disruptions, and output potential problems based on a configuration of the application. In various instances, the described deployment metadata analysis tool may be embodied within a standalone tool and/or embedded within tools deployed within a platform. In many instances, platform may be used interchangeably with cluster and/or computing system.

In various instances, during platform administration, a deployment metadata analysis tool may be run, manually or automatically, to inspect and collect deployed service and application deployment metadata on a platform. The metadata is analyzed to determine if applications and/or services deployed on the platform are susceptible to disruption during normal maintenance operation and/or or platform outages.

For example, a first scenario where a first application and a second application are installed on a shared platform. In this instance, the first application's deployment metadata describes a number of replicas greater than one and the platform has ensured automatically that each replica is on a different node (e.g., a first node and a second node, where the first node and the second node is in the same pod). The second application's deployment metadata describes a number of replicas equal to one and the replica is installed on a first node. When analyzing this configuration for the first and second application, a determination can be made that performing maintenance on the first node will negatively impact the availability of the second application. The output of the tool can be used to inform the platform administrator that the second application is vulnerable to disruption, and maintenance should be possibly delayed until the owners of the second application have been notified and either changed their application to have more replicas or agree that disrupting the second application is acceptable.

In a second scenario, with the same configuration described above, consider if the first application has a POD DisruptionBudget (PDB) that allows for zero disruptions to the first application (i.e., none of the replicas can go offline). In this situation, system maintenance will not be able to proceed on either the first node or the second node, due to the PDB. This configuration causes an undesirable outcome for both platform administrators and the application owners as the platform cannot be regularly maintained and the application can neither be updated nor withstand any type of disruption. The deployment metadata analysis tool is operable to notify platform administrators that maintenance is unlikely to be successful due to configuration of the first application's deployment metadata. In some instances, the deployment metadata analysis tool may be operable to provide remedies to potential disruptions.

The deployment metadata analysis tool may identify a service and/or application by name and ownership information to the platform administrators of each service or application that is determined to have a non-zero risk of disruption. In some instances, a deployment metadata analysis tool may be operable to provide a status and/or state of each application and/or service installed on a platform. In various instances, a deployment metadata analysis tool may be configurable to analyze more or less metadata, be configurable to weight some metadata more heavily than others, and/or configurable to identify patterns in metadata which influence the determination of service disruption. In most instances, the output of an deployment metadata analysis tool may include a report, an input to another automated process, or cause a communication with a person or process to occur. The result of the output of the tool may be utilized to inform service or application owners of deficiencies and/or inform platform administrators with information when determining maintenance and corrective actions on the platform. In various instances, deployment metadata and other metadata collected may include, but is not limited to: PodDisruptionBudgets, replica count, grace period timeout, readiness probe configuration, health check configuration, uptime, labels, annotations, deployment status, and other useful metadata that describes the desired and/or current state of a service and/or application deployment.

FIG. 1 depicts a high-level component diagram of an example computing system 100 in accordance with one or more aspects of the present disclosure. The computing system 100 may include a server 185, an application programming interface (API) server 180, one or more virtual machines (VM 170A-B, 170 generally), nodes (e.g., nodes 110A-C, 110 generally), and a database 175. Each of the applications 198 are deployed according to installation rules 179, which are stored as deployment metadata 150. The API server 180 includes deployment metadata 150 associated with each application (e.g., 198A-D) and/or service installed within the computing system 100. The database 175 includes examples of model installations 177 of each application 198 and/or service installed within the computing system 100. In various instances, the model installations 177 may include one or more model installation rules. In some instances, a computing system 100 (e.g., a cluster) may be deployed in one or multiple geographic locations and have applications 198 installed throughout the computing system 100.

Virtual machines 170A-B may include a virtual machine memory (VM Memory), a virtual CPU (VCPU), virtual memory devices (VMD), and virtual input/output devices (VI/O). For example, virtual machine 170A may include virtual machine memory 195A, a virtual CPU 190A, a virtual memory devices 193A, and a virtual input/output device 194A. Similarly, virtual machine 170B may include virtual machine memory 195B, a virtual CPU 190B, a virtual memory devices 193B, and virtual input/output device 194B. In an example, applications 198A-D may be different applications or services. In another example, applications 198A-D may be different instances of the same application or service.

In an example, a virtual machine 170A may execute a guest operating system and run applications 198A-B which may utilize the underlying VCPU 190A, VIVID 193A, and VI/O device 194A. One or more applications 198A-B may be running on a virtual machine 170A under the respective guest operating system. A virtual machine (e.g., VM 170A-B, as illustrated in FIG. 1) may run on any type of dependent, independent, compatible, and/or incompatible applications on the underlying hardware and operating system ("OS"). In an example, applications (e.g., App 198A-B) run on a virtual machine 170A may be dependent on the underlying hardware and/or OS. In another example embodiment, applications 198A-B run on a virtual machine 170A may be independent of the underlying hardware and/or OS. For example, applications 198A-B run on a first virtual machine 170A may be dependent on the underlying hardware and/or OS while applications (e.g., application 198C-D) run on a second virtual machine (e.g., VM 170B) are independent of the underlying hardware and/or OS. Additionally, applications 198A-B run on a virtual machine 170A may be compatible with the underlying hardware and/or OS. In an example embodiment, applications 198A-B run on a virtual machine 170A may be incompatible with the underlying hardware and/or OS. For example, applications 198A-B run on one virtual machine 170A may be compatible with the underlying hardware and/or OS while applications 198C-D run on another virtual machine 170B are incompatible with the underlying hardware and/or OS.

In an example, virtual machines 170A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-D or services (e.g., microservices) may run in a software container or a virtual machine (e.g., virtual machines 170A-B).

The computing system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
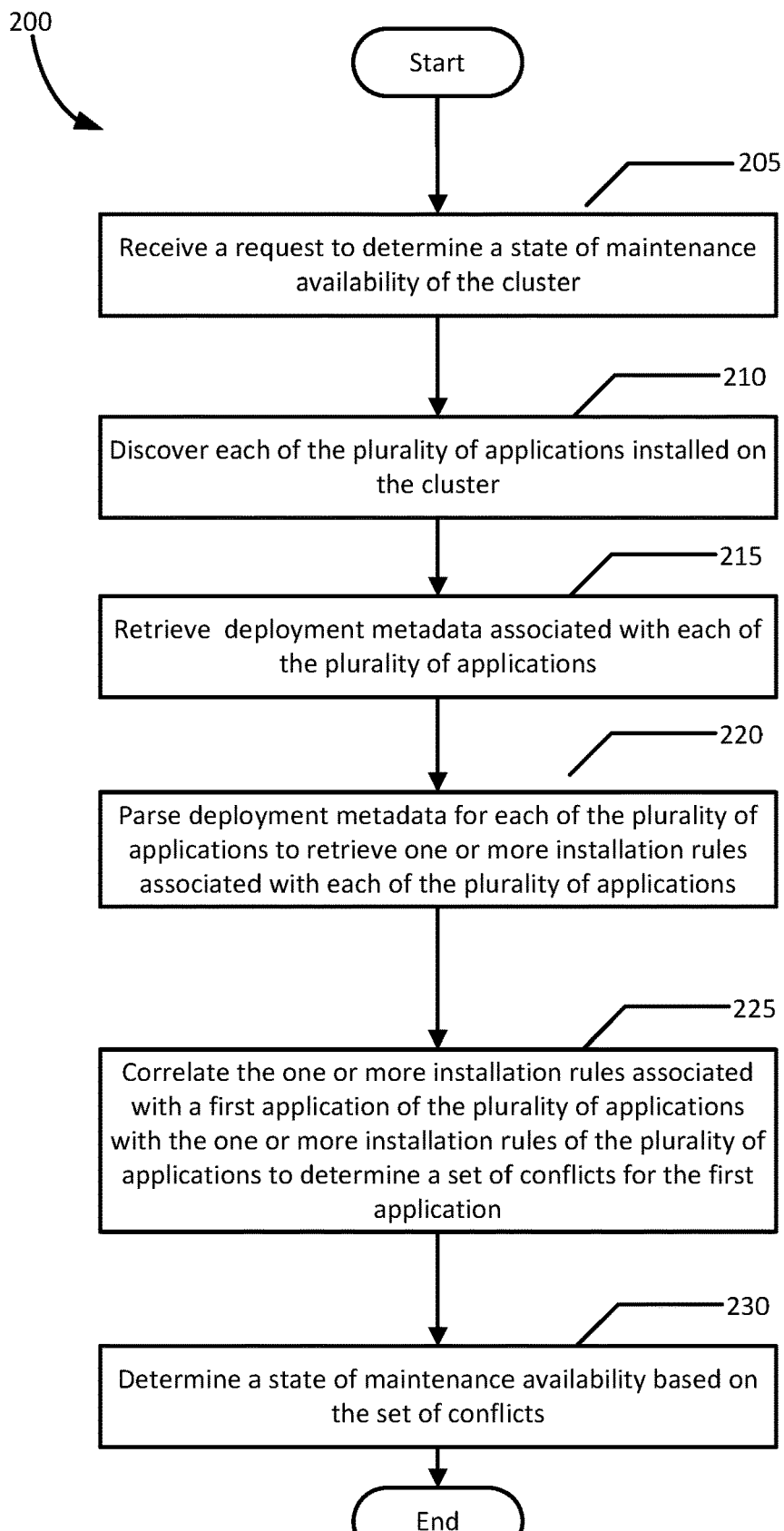
FIG. 2 illustrates a flowchart of an example method for determining a maintenance availability of a computing system according to an example embodiment of the present disclosure.

FIG. 2 illustrates a flowchart of an example method for determining a maintenance availability of a computing system, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks described are optional. The method 200 may be performed by processing logic that may comprise hardware (circuitry, dedicated logic, etc.), software, or a combination of both.

As shown in FIG. 2, an example method 200 may begin with receiving a request to determine a state of maintenance availability of the cluster (block 205). For example, a server 185 may receive a request to determine a state of maintenance availability of the computing system 100 where the computing system 100 (e.g., a cluster) includes a plurality of applications 198 installed on the computing system 100. In some instances, maintenance tasks may be initiated automatically from within a system 100, which may initiate execution of a deployment metadata analysis tool to determine a state of maintenance availability. In other instances, a server 185 may receive an external request to determine a state of maintenance availability. A state of maintenance availability identifies whether or not one or more components within the computing system 100, or the computing system 100 in its entirety, may be vulnerable to disruptions. In various instances, a disruption may include one or more components (e.g., a VM 170, a node 110, API server 180, and/or other component) within the computing system 100 failing and/or requiring system maintenance causing the one or more components be restarted and/or powered down for any amount of time. A disruption to the computing system 100 may occur due to, but not limited to, patching an Operating System, hardware failure, software installation requiring a reboot, to save power, decommissioning of the computing system 100, or one or more components of the system 100, and/or any other reason that may require powering off a machine within the computing system 100. A step in maintaining the computing system 100 is determining whether or not one or more systems (i.e., nodes 110, VM 170, server 185, and/or API server 180) may be shutdown and/or rebooted for maintenance without affecting installed applications 198.

Next, the example method 200 may include discovering each of the plurality of applications installed on the cluster (block 210). For example, upon receiving a request to determine a state of maintenance availability of the computing system 100, the server 185 discovers which applications 198 and/or services are installed on the computing system 100 by querying the API server 180 to determine which applications 198 to analyze. An application programming interface (API) server 180 stores deployment metadata 150 containing information associated with the installation of each application 198. For example, deployment metadata 150 may include pod disruption budgets, replica count, grace period timeout, readiness probe configuration, health check configuration, uptime, labels, annotations, deployment status, and other useful metadata that describes the desired and/or current state of a service or application 198 deployment. In some instances, the API server 180 may include a manifest for each installed application 198 and/or service, where a manifest includes deployment metadata associated with the installed application 198 and/or service. In various examples, deployment metadata 150 may include installation rules 179 associated with each application 198 as well as other information about the deployment of the application 198.

Next, the example method 200 may include retrieving the deployment metadata associated with each of the plurality of applications (block 215). For example, upon determining which applications 198 and/or services are installed on the computing system 100, the server 185 retrieves deployment metadata 150 associated with each application 198 from the API server 180. Deployment metadata 150 may be parsed to determine how an application 198 is deployed within a computing system 100. In various instances, application 198 may be used interchangeably with service. Next, the example method 200 may include parsing the deployment metadata for each of the plurality of applications to retrieve one or more installation rules associated with each of the plurality of applications (block 220). For example, the server 185 parses the deployment metadata 150 to retrieve installation rules 179 associated with each application 198 installed within the computing system 100. In various instances, deployment metadata may be a manifest and/or document including deployment metadata for an application 198. In some instances, an installation rule 179 for an application 198 may include VM affinity, which may indicate whether an application, or one or more portions of an application, is to be installed on a single VM 170 or multiple VMs 170. In other instances, an installation rule 179 for an application may include node affinity, which may indicate whether an application, or one or more portions of an application, is to be installed on a single node 110 or multiple nodes 110.

Next, the example method 200 may include correlating the one or more installation rules associated with a first application of the plurality of applications with the one or more installation rules from the plurality of applications to determine a set of conflicts for the first application (block 225). For example, the server 185 correlates the installation rules 179 for a first application 198D with one or more installation rules 179 of the plurality of applications 198 to determine a set of conflicts for the application 198D. For each conflict of the set of conflicts for the first application 198D, each conflict is associated with a potential disruption related to the first application 198D. In certain instances, an application 198 may conflict with one or more other applications 198 installed within the computing system 100. For example, if one or more applications 198 are only installed on a single VM 170 and/or a single node 110, and the specific VM 170 or node 110 is rebooted for maintenance, the maintenance activity may cause disruptions for the one or more applications 198. In some instances, an application 198 may have conflicts with itself. For example, an application 198 may have a front end and a back end. In this instance, if the front end and the back end are installed on the same VM 170 or node 110 and that specific node is taken down for maintenance, the application 198 has conflicts with itself and will be disrupted by the maintenance activity. In various instances, potential disruptions may be avoided by deploying multiple instances of an application and/or multiple portions of an application (e.g., a backend, front end, and database) on separate VMs 170 and/or nodes 110. In these instances, if a single VM 170 or node 110 fails or is rebooted, other instances of the application 198 are still functional in other parts of the computing system 100.

Next, the example method 200 may include determining a state of maintenance availability based on the set of conflicts (block 230). For example, the server 185 compares conflicts of the one or more applications 198 to determine whether a conflict with at least one other application 198 (including itself) exists. If one or more conflicts exist for an application 198, the state of maintenance availability may be set to unavailable. If none of the applications 198 conflict with each other, the state of maintenance availability may be set to available. In various instances, the computing system 100 may determine one or more updates to installation rules 179 based on the set of conflicts to resolve potential disruptions to a deployment of any application 198.

Figure 3:
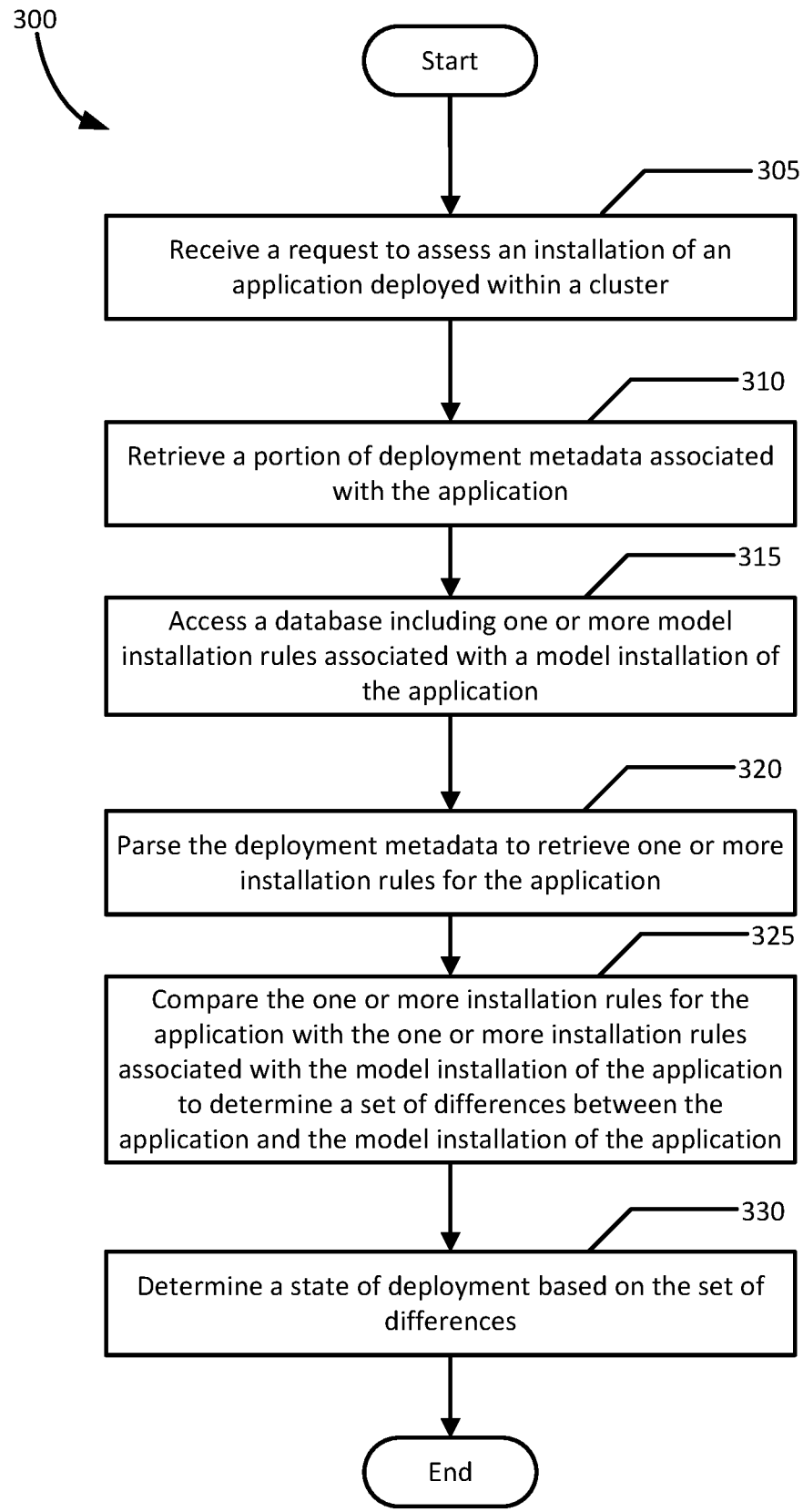
FIG. 3 illustrates a flowchart of an example method of assessing an installation of an application, in accordance with an embodiment of the present disclosure.

FIG. 3 illustrates a flowchart of an example method of assessing an installation of an application, in accordance with an embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated and some of the blocks described are optional. The method 300 may be performed by processing logic that may comprise hardware (circuitry, dedicated logic, etc.), software, or a combination of both.

As shown in FIG. 3, an example method 300 may begin by receiving a request to assess an application deployed within a cluster (block 305). For example, a server 185 receives a request to analyze and/or assess an installation of an application 198D within the computing system 100. Depending on a state of deployment of an application 198D, the application 198D may be reconfigured, if needed, to avoid foreseeable disruptions. In various instances, an installation of a single application 198 may span across one or more VM's 170 and/or may span across one or more nodes 110. In certain instances, an installation of a single application 198D may include installation of multiple modules and/or module copies of the application 198 across one or more nodes 110 and/or one or more VMs 170. In one example, an ideal installation of application 198D includes four copies of the application 198D installed throughout the computing system 100 to prevent potential disruptions from a VM 170 and/or a node 110 from going offline for various reasons (e.g., system maintenance, hardware failure, software failure, virus, and/or other reasons a one or more nodes and/or VMs could go offline). However, if the application 198D was improperly configured when deployed to the computing system 100 (e.g., configured with a VM affinity for a single VM), each of the four copies of the application 198D may potentially be installed on a single VM 170 or a single node 110 which may increase a possibility of disruption of availability and/or service from the application 198.

Next, the example method 300 may include retrieving deployment metadata associated with the application (block 310). For example, the server 185 retrieves deployment metadata associated with application 198D from the API server 180. The API server 180 stores deployment metadata 150 for each application 198 installed on the computing system 100.

Deployment metadata 150 associated with each application 198 installed on the computing system 100 may be retrieved from the API server 180. Next, the example method 300 may include accessing a database including one or more model installation rules associated with a model installation of the application (block 315). For example, the server 185 accesses a database 175 which includes a model installation 177 of the application 198D. The model installation 177 may include one or more rules and/or recommendations for a model configuration (e.g., rules and/or recommendations related to node affinity/anti-affinity, fault affinity/anti-affinity, POD affinity/anti-affinity). If an installation of an application 198 does not align with the model installation 177, there may be an increased likelihood for potential disruptions when attempting to use the application 198. To avoid potential disruptions, implementation of each application 198 should align, as much as possible, with the model installation 177.

Next, the example method 300 may include parsing the deployment metadata to retrieve one or more installation rules for the application (block 320). For example, the server 185 parses the deployment metadata 150 to retrieve one or more installation rules 179 for application 198D. Parsing may include breaking a file including deployment metadata 150 down into sub components identifying one or more installation rules 179 used to deploy an application 198D. Next, the example method 300 may include comparing the one or more installation rules for the application with the one or more installation rules associated with the model installation of the application to determine a set of differences between the application and the model installation of the application (block 325). For example, the server 185 compares the one or more installation rules 179 for the application 198D with one or more installation rules associated with the model installation 177 of the application 198D to determine a set of differences between the application 198D and the model installation 177. Each of the one or more rules of the application 198 and model installation 177 are compared to determine whether the application 198D is installed in a non-model configuration, which could potentially increase the possibility of disruption for application 198D. Next, the example method 300 may include determining a state of deployment based on the differences (block 330). For example, the server 185 analyzes the set of differences to determine a state of deployment of the application 198D. An application 198D that has been deployed in a configuration that aligns with the model installation 177 may have a state of properly deployed. An application 198 that has been deployed in a configuration that does not entirely align with the model installation 177 may have a state of improper deployment. In some instance, depending on how many differences exist between the installation of application 198 and the model installation 177, a state of deployment also include a level of deployment. In these instances, a level of deployment may be low, medium, or high corresponding to the potential for disruptions to availability of an application 198.

Figure 4A:
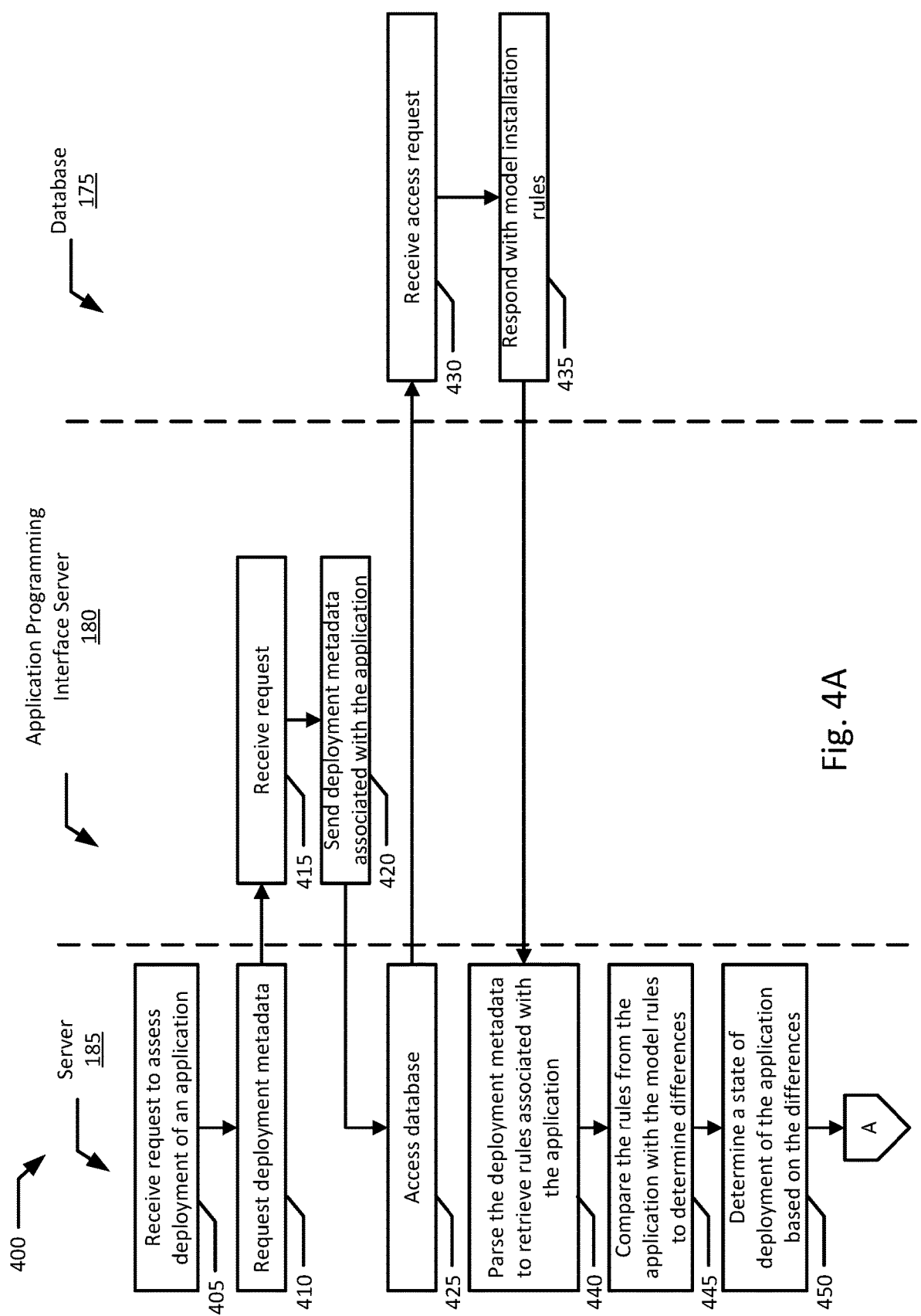
FIGS. 4A and 4B illustrate a flow diagram of an example method of assessing a deployment of an application within a computing system, in accordance with an embodiment of the present disclosure.
Figure 4B:
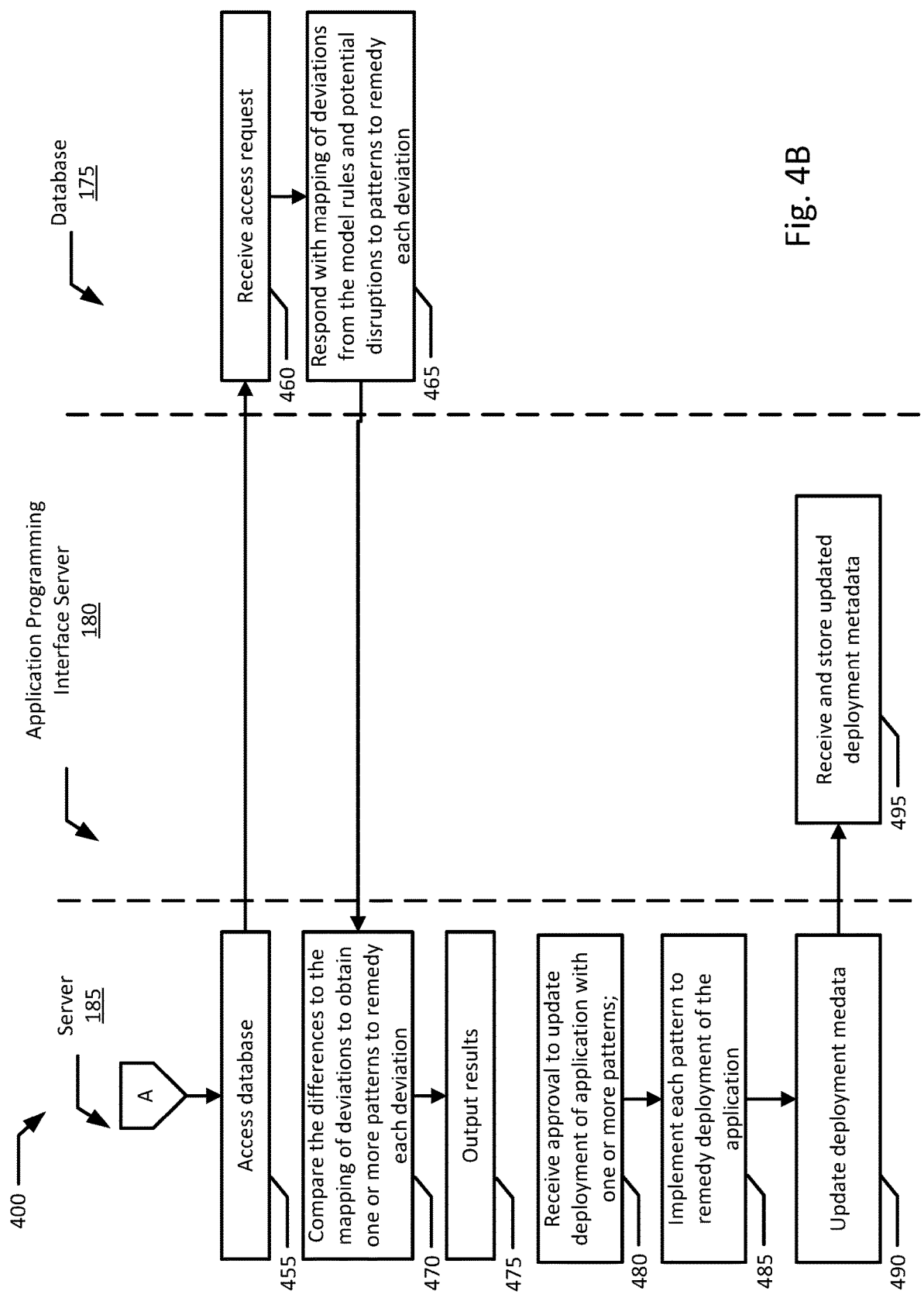

FIGS. 4A and 4B illustrate a flow diagram of an example method assessing a deployment of an application within a computing system, in accordance with an embodiment of the present disclosure. Although the example method 400 is described with reference to the flow diagram illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. For example, in the illustrated flow diagram, a server 185 interacts with an API server 180 and a database 175 to retrieve information to analyze a deployment of an application 198.

As shown in FIG. 4A, the server 185 receives a request to assess a deployment of an application 198 (block 405). The server 185 requests deployment metadata 150 from the API server 180 (block 410). Upon receiving the request for deployment metadata 150 (block 415), the API server 180 retrieves the deployment metadata 150 and sends the deployment metadata 150 associated with the application 198 to the server 185 (block 420). In various instances, an API server 180 may store deployment metadata 150 in a database 175. In certain embodiments, the database 175 may also include metadata related to a model installation 177 of each application 198 installed within the computing system 100. Next, the server 185 accesses a database 175 to retrieve rules associated with the model installation 177 (block 425). Upon receiving the access request at the database 175 (block 430), the database 175 responds with rules associated with the model installation 177 (block 435). The server 185 parses the deployment metadata 150 to retrieve one or more rules associated with the application 198 (block 440). The server 185 then compares the one or more rules from the application 198 with the model rules from the model installation 177 to determine differences between the installation of the application 198 and a deployment of a model installation 177 (block 445). From the differences, the server 185 determines a state of deployment of the application 198 (block 450). In various examples, a state of deployment may equate to one of multiple levels indicating a potential for disruption. For example, in one instance, a low level of disruption may align with an installation of an application 198 that aligns with the model installation 177. In another instance, a medium level of disruption may align with an installation of an application 198 that only partially aligns with the model installation 177. In yet other instances, a high level of disruption may align with an installation of an application 198 that does not align, at all, with the model installation 177.

In various instances, a database 175 within a computing system 100 may include a mapping of deviations from the model rules of the model installation 177 to patterns that remedy each deviation. For example, a deviation may be having no node anti-affinity policy versus having a node anti-affinity policy that designates each portion of an application 198 be deployed on a different node 110. A server 185 accesses a database 175 (block 455) including a mapping of deviations from the model rules to remedial patterns. Upon receiving the access request (block 460), the database 175 responds with access to the mapping of deviations from the model rules and potential disruptions to patterns available to remedy each deviation (block 465). The server 185 compares the differences to the mapping of deviations to obtain one or more patterns to remedy each deviation in the application 198 (block 470) and outputs the results of the comparison (block 475). Once the server 185 receives approval to update a deployment of the application with one or more patterns (block 480), the server 185 implements each pattern to remedy deployment of each application (block 485). Next, the server 195 updates the deployment metadata within the application server 180 (block 490). Upon receiving the update from the server 185, the API server 180 stores the updated deployment metadata 150 (block 495).

Figure 5:
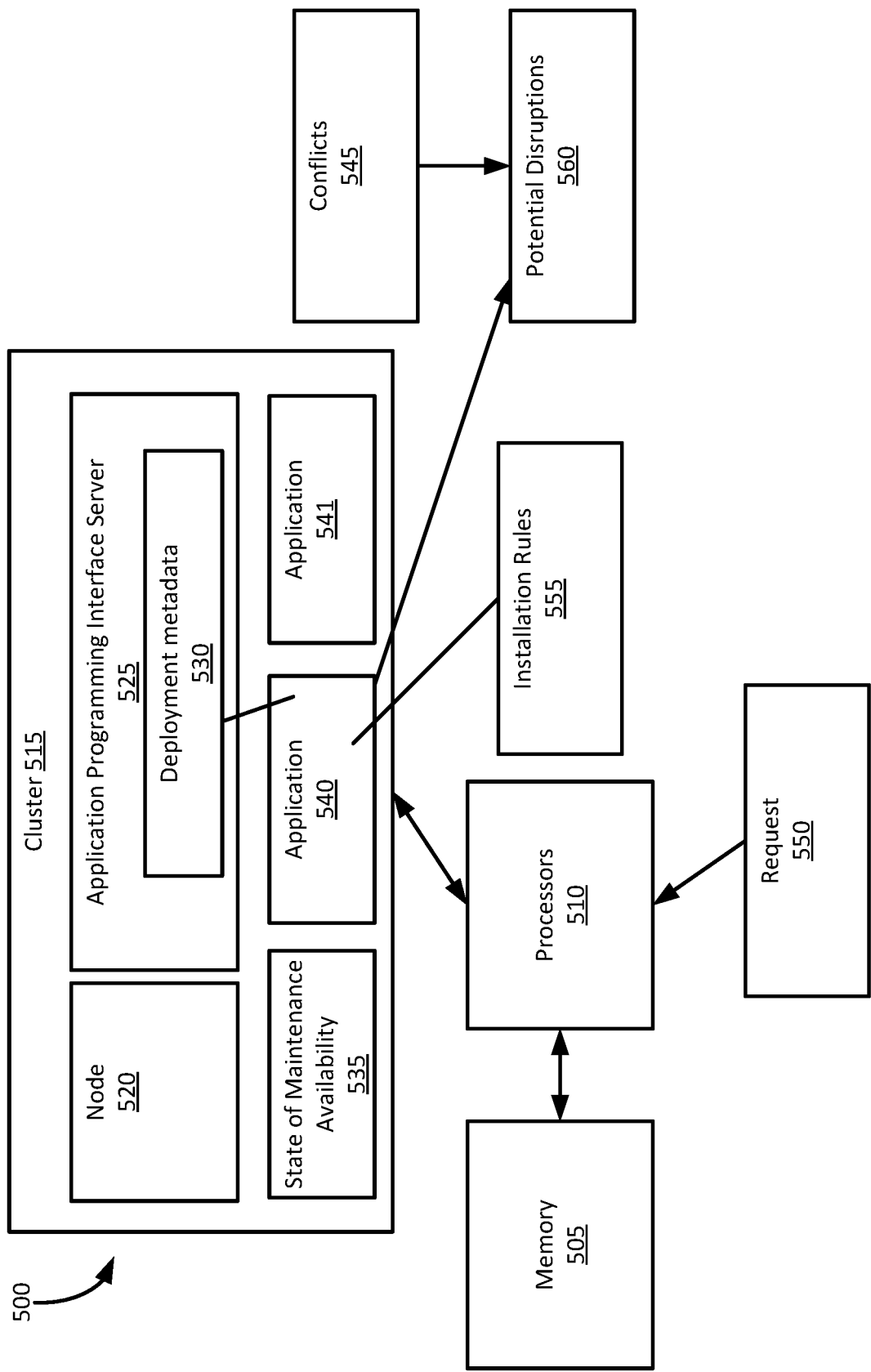
FIG. 5 illustrates a block diagram of an example system for determining maintenance availability of each component of a computing system, according to an example embodiment of the present disclosure.

FIG. 5 is a block diagram of system 500, which includes a cluster 515, memory 505 and processors 510, where the processors 510 are in communication with the memory 505. The cluster includes one or more nodes 520 and an application programming interface (API) server 525. The processor 510 is configured to receive a request 550 to determine a state of maintenance availability 535 of the cluster 515, where a plurality of applications (540, 541) are installed on the cluster 515. Each of the plurality of applications (540, 541) installed on the cluster 515 are discovered. Deployment metadata 530 associated with each of the plurality of applications (540, 541) are retrieved. The deployment metadata 530 for each of the plurality of applications (540, 541) is parsed to retrieve one or more installation rules 555 associated with each of the plurality of applications (540, 541). The one or more installation rules 555 associated with a first application 540 of the plurality of applications (540, 541) is correlated with the one or more installation rules of the plurality of applications (540, 541) to determine a set of conflicts 545 for the first application. Each of the conflicts 545 of the set of conflicts 545 for the first application 540 is associated with a potential disruption 545 related to the first application 540. Next, a state of maintenance availability 535 is determined based on the set of conflicts 545.

Figure 6:
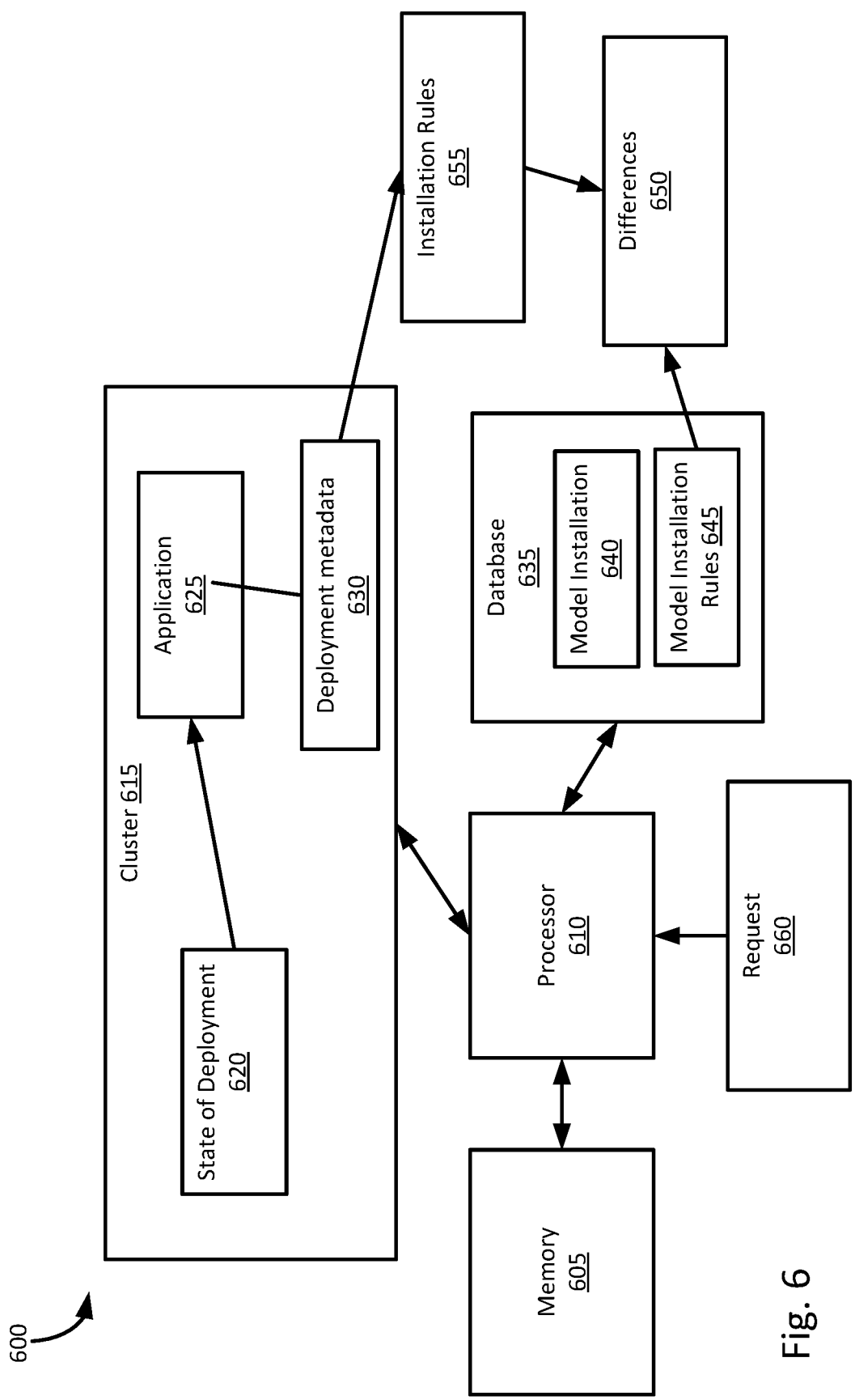
FIG. 6 illustrates a block diagram of an example system for assessing an installation of an application within a computing system, according to an example embodiment of the present disclosure.

FIG. 6 is a block diagram of system 600 including a memory 605 and a processor 610, where the processor 610 is in communication with the memory 605. The processor 610 is configured to receive a request 660 to assess an installation of an application 625 deployed within a cluster 615. Next, deployment metadata 630 associated with the application 625 is retrieved. A database 635 including one or more installation rules 645 associated with a model installation 640 of the application 625 is accessed. The deployment metadata 630 is parsed to retrieve one or more installation rules 655 for the application 625. Next, the one or more installation rules 655 for the application 625 is compared with the one or more installation rules 645 associated with the model installation 640 of the application 625 to determine a set of differences 650 between the application 625 and the model installation 640 of the application 625. The state of deployment 620 is determined based on the set of differences 650.

Aspects of the subject matter described herein may be useful alone or in combination with one or more aspects described herein. In a 1st exemplary aspect of the present disclosure, a system, comprising a cluster, including one or more nodes and an application programming interface (API) server; a memory; and one or more processors in communication with the memory, wherein the processor is configured to receive a request to determine a state of maintenance availability of the cluster, wherein a plurality of applications are installed on the cluster; discover each of the plurality of applications installed on the cluster; retrieve a deployment metadata associated with each of the plurality of applications; parse the deployment metadata for each of the plurality of applications to retrieve one or more installation rules associated with each of the plurality of applications; correlate the one or more installation rules associated with a first application of the plurality of applications with the one or more installation rules of the plurality of applications to determine a set of conflicts for the first application, wherein each conflict of the set of conflicts for the first application is associated with a potential disruption related to the first application; and determine a state of maintenance availability based on the set of conflicts.

In a 2nd exemplary aspect of the present disclosure, which may be used in combination with any one or more of the preceding aspects (i.e., the 1st aspect), where correlate comprises determining which portions of the one or more installation rules associated with the first application match one or more of other applications of the plurality of applications.

In a 3rd exemplary aspect of the present disclosure, which may be used in combination with any one or more of the preceding aspects (i.e., the 1st aspect), where correlate comprises determining whether downtime of a first node within the cluster creates an effect on the first application.

In a 4th exemplary aspect of the present disclosure, which may be used in combination with any one or more of the preceding aspects (i.e., the 1st aspect), where correlate comprises determining whether downtime of each node within the cluster and associated with a second application of the plurality of applications, creates an effect on the first application.

In a 5th exemplary aspect of the present disclosure, which may be used in combination with any one or more of the preceding aspects (i.e., the 1st aspect), where the processor is further configured to output the state of maintenance availability and the set of conflicts.

In a 6th exemplary aspect of the present disclosure, which may be used in combination with any one or more of the preceding aspects (i.e., the 1st aspect), where the state of maintenance availability is available.

In a 7th exemplary aspect of the present disclosure, which may be used in combination with any one or more of the preceding aspects (i.e., the 1st aspect), where the state of maintenance availability is unavailable.

In a 8th exemplary aspect of the present disclosure, which may be used in combination with any one or more of the preceding aspects (i.e., the 1st aspect), where the processor is further configured to modify one or more rules for an application of the one or more of the plurality of applications modify the state of maintenance availability the application.

Aspects of the subject matter described herein may be useful alone or in combination with one or more aspects described herein. In a 9th exemplary aspect of the present disclosure, a method, comprising receiving a request to determine a state of maintenance availability of a cluster, wherein a plurality of applications are installed on the cluster; discovering each of the plurality of applications installed on the cluster; retrieving a deployment metadata associated with each of the plurality of applications; parsing the deployment metadata for each of the plurality of applications to retrieve one or more installation rules associated with each of the plurality of applications; correlating the one or more installation rules associated with a first application of the plurality of applications with the one or more installation rules of the plurality of applications to determine a set of conflicts for the first application, wherein each conflict of the set of conflicts for the first application is associated with a potential disruption related to the first application; and determining a state of maintenance availability based on the set of conflicts.

In a 10th exemplary aspect of the present disclosure, which may be used in combination with any one or more of the preceding aspects (i.e., the 9th aspect), where correlate comprises determining which portions of the one or more installation rules associated with the first application match one or more of other applications of the plurality of applications.

In a 11th exemplary aspect of the present disclosure, which may be used in combination with any one or more of the preceding aspects (i.e., the 9th aspect), where correlate comprises determining whether downtime of a first node within the cluster creates an effect on the first application.

In a 12th exemplary aspect of the present disclosure, which may be used in combination with any one or more of the preceding aspects (i.e., the 9th aspect), where correlate comprises determining whether downtime of each node within the cluster and associated with a second application of the plurality of applications, creates an effect on the first application.

In a 13th exemplary aspect of the present disclosure, which may be used in combination with any one or more of the preceding aspects (i.e., the 9th aspect), where the method further comprises outputting the state of maintenance availability and the set of conflicts.

In a 14th exemplary aspect of the present disclosure, which may be used in combination with any one or more of the preceding aspects (i.e., the 9th aspect), where the state of maintenance availability is available.

In a 15th exemplary aspect of the present disclosure, which may be used in combination with any one or more of the preceding aspects (i.e., the 9th aspect), where the state of maintenance availability is unavailable.

In a 16th exemplary aspect of the present disclosure, which may be used in combination with any one or more of the preceding aspects (i.e., the 9th aspect), where the method further comprises modifying one or more rules for an application of the one or more of the plurality of applications to modify the state of maintenance availability of the application.

Aspects of the subject matter described herein may be useful alone or in combination with one or more aspects described herein. In a 17th exemplary aspect of the present disclosure, a non-transitory machine readable medium storing code, which when executed by a processor is configured to receive a request to determine a state of maintenance availability of a cluster, wherein a plurality of applications are installed on the cluster; discover each of the plurality of applications installed on the cluster; retrieve a deployment metadata associated with each of the plurality of applications; parse the deployment metadata for each of the plurality of applications to retrieve one or more installation rules associated with each of the plurality of applications; correlate the one or more installation rules associated with a first application of the plurality of applications with the one or more installation rules of the plurality of applications to determine a set of conflicts for the first application, wherein each conflict of the set of conflicts for the first application is associated with a potential disruption related to the first application; and determine a state of maintenance availability based on the set of conflicts.

In a 18th exemplary aspect of the present disclosure, which may be used in combination with any one or more of the preceding aspects (i.e., the 17th aspect), where correlate comprises determining which portions of the one or more installation rules associated with the first application match one or more of other applications of the plurality of applications.

In a 19th exemplary aspect of the present disclosure, which may be used in combination with any one or more of the preceding aspects (i.e., the 17th aspect), where correlate comprises determining whether downtime of a first node within the cluster creates an effect on the first application.

In a 20th exemplary aspect of the present disclosure, which may be used in combination with any one or more of the preceding aspects (i.e., the 17th aspect), where correlate comprises determining whether downtime of each node within the cluster and associated with a second application of the plurality of applications, creates an effect on the first application.

In a 21st exemplary aspect of the present disclosure, which may be used in combination with any one or more of the preceding aspects (i.e., the 17th aspect), where the processor is further configured to output the state of maintenance availability and the set of conflicts.

In a 22nd exemplary aspect of the present disclosure, which may be used in combination with any one or more of the preceding aspects (i.e., the 17th aspect), where the state of maintenance availability is available.

In a 23rd exemplary aspect of the present disclosure, which may be used in combination with any one or more of the preceding aspects (i.e., the 17th aspect), where the state of maintenance availability is unavailable.

In a 24th exemplary aspect of the present disclosure, which may be used in combination with any one or more of the preceding aspects (i.e., the 17th aspect), where when executed by the processor, is further configured to modify one or more rules for an application of the one or more of the plurality of applications modify the state of maintenance availability of the application.

Aspects of the subject matter described herein may be useful alone or in combination with one or more aspects described herein. In a 25th exemplary aspect of the present disclosure, a system, comprising: a means for receiving a request to determine a state of maintenance availability of a cluster, wherein a plurality of applications are installed on the cluster; a means for discovering each of the plurality of applications installed on the cluster; a means for retrieving a deployment metadata associated with each of the plurality of applications; a means for parsing the deployment metadata for each of the plurality of applications to retrieve one or more installation rules associated with each of the plurality of applications; a means for correlating the one or more installation rules associated with a first application of the plurality of applications with the one or more installation rules of the plurality of applications to determine a set of conflicts for the first application, wherein each conflict of the set of conflicts for the first application is associated with a potential disruption related to the first application; and a means for determining a state of maintenance availability based on the set of conflicts.

Aspects of the subject matter described herein may be useful alone or in combination with one or more aspects described herein. In a 26th exemplary aspect of the present disclosure, a system, comprising: a memory; and one or more processors in communication with the memory, wherein the processor is configured to: receive a request to assess an installation of an application deployed within a cluster; retrieve a deployment metadata associated with the application; access a database including one or more model installation rules associated with a model installation of the application; parse the deployment metadata to retrieve one or more installation rules for the application; compare the one or more installation rules for the application with the one or more installation rules associated with the model installation of the application to determine a set of differences between the application and the model installation of the application; and determine a state of deployment based on the set of differences.

In a 27th exemplary aspect of the present disclosure, which may be used in combination with any one or more of the preceding aspects (i.e., the 26th aspect), where the processor is further configured to: output the state of deployment and the set of differences.

In a 28th exemplary aspect of the present disclosure, which may be used in combination with any one or more of the preceding aspects (i.e., the 26th aspect), where the processor is further configured to: determine a set of updates to the one or more installation rules for the application based on the set of differences, wherein the updates includes at least one rule from the one or more model installation rules.

In a 29th exemplary aspect of the present disclosure, which may be used in combination with any one or more of the preceding aspects (i.e., the 26th aspect), where deployment metadata is stored within an application programming interface (API) server.

In a 30th exemplary aspect of the present disclosure, which may be used in combination with any one or more of the preceding aspects (i.e., the 29th aspect), where the API server stores a manifest for each application installed on the cluster.

In a 31st exemplary aspect of the present disclosure, which may be used in combination with any one or more of the preceding aspects (i.e., the 26th aspect), where deployment metadata includes node affinity.

In a 32nd exemplary aspect of the present disclosure, which may be used in combination with any one or more of the preceding aspects (i.e., the 26th aspect), where deployment metadata includes POD affinity.

Aspects of the subject matter described herein may be useful alone or in combination with one or more aspects described herein. In a 33rd exemplary aspect of the present disclosure, a method, comprising: receiving a request to assess an installation of an application deployed within a cluster; retrieving a deployment metadata associated with the application; accessing a database including one or more model installation rules associated with a model installation of the application; parsing the deployment metadata to retrieve one or more installation rules for the application; comparing the one or more installation rules for the application with the one or more installation rules associated with the model installation of the application to determine a set of differences between the application and the model installation of the application; and determining a state of deployment based on the set of differences.

In a 34th exemplary aspect of the present disclosure, which may be used in combination with any one or more of the preceding aspects (i.e., the 33rd aspect), where the method further comprises outputting the state of deployment and the set of differences.

In a 35th exemplary aspect of the present disclosure, which may be used in combination with any one or more of the preceding aspects (i.e., the 33rd aspect), where the method further comprises determining a set of updates to the one or more installation rules for the application based on the set of differences, wherein the updates includes at least one rule from the one or more model installation rules.

In a 36th exemplary aspect of the present disclosure, which may be used in combination with any one or more of the preceding aspects (i.e., the 33rd aspect), where deployment metadata is stored within an application programming interface (API) server.

In a 37th exemplary aspect of the present disclosure, which may be used in combination with any one or more of the preceding aspects (i.e., the 36th aspect), where the API server stores a manifest for each application installed on the cluster.

In a 38th exemplary aspect of the present disclosure, which may be used in combination with any one or more of the preceding aspects (i.e., the 33rd aspect), where deployment metadata includes node affinity.

In a 39th exemplary aspect of the present disclosure, which may be used in combination with any one or more of the preceding aspects (i.e., the 33rd aspect), where deployment metadata includes POD affinity.

Aspects of the subject matter described herein may be useful alone or in combination with one or more aspects described herein. In a 40th exemplary aspect of the present disclosure, a non-transitory machine readable medium storing code, which when executed by a processor is configured to: receive a request to assess an installation of an application deployed within a cluster; retrieve a deployment metadata associated with the application; access a database including one or more model installation rules associated with a model installation of the application; parse the deployment metadata to retrieve one or more installation rules for the application; compare the one or more installation rules for the application with the one or more installation rules associated with the model installation of the application to determine a set of differences between the application and the model installation of the application; and determine a state of deployment based on the set of differences.

In a 41st exemplary aspect of the present disclosure, which may be used in combination with any one or more of the preceding aspects (i.e., the 40th aspect), which, when executed by the processor, is further configured to: output the state of deployment and the set of differences.

In a 42nd exemplary aspect of the present disclosure, which may be used in combination with any one or more of the preceding aspects (i.e., the 40th aspect), which, when executed by the processor, is further configured to: determine a set of updates to the one or more installation rules for the application based on the set of differences, wherein the updates includes at least one rule from the one or more model installation rules.

In a 43rd exemplary aspect of the present disclosure, which may be used in combination with any one or more of the preceding aspects (i.e., the 40th aspect), where deployment metadata is stored within an application programming interface (API) server.

In a 44th exemplary aspect of the present disclosure, which may be used in combination with any one or more of the preceding aspects (i.e., the 43rd aspect), where the API server stores a manifest for each application installed on the cluster.

In a 45th exemplary aspect of the present disclosure, which may be used in combination with any one or more of the preceding aspects (i.e., the 40th aspect), where deployment metadata includes node affinity.

In a 46th exemplary aspect of the present disclosure, which may be used in combination with any one or more of the preceding aspects (i.e., the 40th aspect), where deployment metadata includes POD affinity.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
a cluster, including one or more nodes and an application programming interface (API) server;
a memory; and
one or more processors in communication with the memory, wherein the one or more processors are configured to, prior to performing a maintenance activity associated with a node of the one or more nodes in the cluster:
receive a request to determine a state of maintenance availability of the cluster, wherein a plurality of applications are installed on the cluster, and wherein the state of maintenance availability of the cluster indicates whether or not one or more applications of the plurality of applications or the cluster in its entirety is vulnerable to disruptions due to the maintenance activity; and
in response to receiving the request:
query the API server to retrieve deployment metadata to discover each of the plurality of applications installed on the cluster;
in response to retrieving the deployment metadata, parse the deployment metadata for each of the plurality of applications to retrieve one or more installation rules associated with each of the plurality of applications;
based on retrieving the one or more installation rules, correlate a first subset of the one or more installation rules associated with a first application of the plurality of applications with a second subset of the one or more installation rules of the plurality of applications to determine a set of conflicts for the first application, wherein determining the set of conflicts comprises determining whether a future downtime of a first node within the cluster would create an effect on the first application, wherein determining the set of conflicts further comprises determining whether a future downtime of each node within the cluster and associated with a second application of the plurality of applications would create an effect on the first application, wherein each conflict of the set of conflicts for the first application is associated with a potential disruption related to the first application caused by the maintenance activity associated with the node;
determine the state of maintenance availability based on the set of conflicts for the first application; and
based on determining the state of maintenance availability, output a notification to a user based on the state of maintenance availability, wherein the notification indicates whether the maintenance activity is unlikely to be successful based on the state of maintenance availability.

2. The system of claim 1, wherein the one or more processors are configured to correlate the first subset with the second subset to determine the set of conflicts by:
determining which portions of the one or more installation rules associated with the first application match one or more of other applications of the plurality of applications.

3. The system of claim 1, wherein the one or more processors are further configured to output the state of maintenance availability and the set of conflicts.

4. The system of claim 1, wherein the state of maintenance availability indicates the first application is available during maintenance of the cluster.

5. The system of claim 1, wherein the state of maintenance availability indicates the first application is unavailable during maintenance of the cluster.

6. The system of claim 1, wherein the one or more processors are further configured to:
modify one or more rules for an application of the one or more of the plurality of applications to modify the state of maintenance availability associated with the application.

7. The system of claim 1, wherein the maintenance activity comprises rebooting the node.

8. The system of claim 1, wherein the one or more processors are further configured to:
in response to performing the maintenance activity associated with the node, provide one or more remedy measures to remedy a disruption related to the first application caused by the maintenance activity associated with the node.

9. A method comprising, prior to performing a maintenance activity associated with a node of one or more nodes in a cluster:
receiving a request to determine a state of maintenance availability of the cluster, wherein a plurality of applications are installed on the cluster, and wherein the state of maintenance availability of the cluster indicates whether or not one or more applications of the plurality of applications or the cluster in its entirety is vulnerable to disruptions due to the maintenance activity; and
in response to receiving the request:
querying an API server to retrieve deployment metadata to discover each of the plurality of applications installed on the cluster;
in response to retrieving the deployment metadata, parsing the deployment metadata for each of the plurality of applications to retrieve one or more installation rules associated with each of the plurality of applications;
based on retrieving the one or more installation rules, correlating a first set of the one or more installation rules associated with a first application of the plurality of applications with a second set of the one or more installation rules of the plurality of applications to determine a set of conflicts for the first application, wherein determining the set of conflicts comprises determining whether a future downtime of a first node within the cluster would create an effect on the first application, wherein determining the set of conflicts further comprises determining whether a future downtime of each node within the cluster and associated with a second application of the plurality of applications would create an effect on the first application, wherein each conflict of the set of conflicts for the first application is associated with a potential disruption related to the first application caused by the maintenance activity associated with the node; and
based on determining the set of conflicts, determining the state of maintenance availability based on the set of conflicts for the first application; and
based on determining the state of maintenance availability, outputting a notification to a user indicating the set of conflicts for the first application and the state of maintenance availability, wherein the notification indicates whether the maintenance activity is unlikely to be successful based on the state of maintenance availability.

10. The method of claim 9, wherein correlating the first set with the second set comprises:
   determining which portions of the one or more installation rules associated with the first application match one or more of other applications of the plurality of applications.

11. The method of claim 9, further comprising:
   outputting the state of maintenance availability and the set of conflicts.

12. The method of claim 9, further comprising:
   modifying one or more rules for an application of the one or more of the plurality of applications to modify the state of maintenance availability of the application.

13. A system, comprising:
   one or more processors; and
   a non-transitory computer-readable medium comprising program code that is executable by the one or more processors to, prior to a maintenance activity associated with a node of one or more nodes in a cluster:
      receive a request to assess an installation of a first application deployed within the cluster, where in the first application is one of a plurality of applications installed on the cluster;
      in response to receiving the request, retrieve deployment metadata associated with the plurality of applications;
      parse the deployment metadata to retrieve one or more installation rules associated with each of the plurality of applications;
      correlate a first set of the one or more installation rules associated with a first application of the plurality of applications with a second set of the one or more installation rules of the plurality of applications to determine a set of conflicts for the first application, wherein determining the set of conflicts comprises determining whether a future downtime of the node within the cluster would create an effect on the first application, wherein determining the set of conflicts further comprises determining whether a future downtime of each node within the cluster and associated with a second application of the plurality of applications would create an effect on the first application;
      based on determining the set of conflicts, determine a state of deployment, wherein the state of deployment corresponds to one of multiple levels indicating a potential for disruption in the system caused by the maintenance activity;
      based on determining the state of deployment, determine a state of maintenance availability; and
      based on determining a state of maintenance availability, output a notification to a user based on the state of deployment and the state of maintenance availability, wherein the notification indicates whether the maintenance activity is unlikely to be successful.

14. The system of claim 13, wherein the non-transitory computer-readable medium further comprises program code that is executable by the one or more processors to:
   output the state of deployment and the set of conflicts.

15. The system of claim 13, wherein the non-transitory computer-readable medium further comprises program code that is executable by the one or more processors to:
   determine a set of updates to the one or more installation rules associated with each of the plurality of applications based on the set of conflicts, wherein the set of updates include at least one rule from one or more model installation rules.

16. The system of claim 13, wherein the deployment metadata associated with the first application is stored within an application programming interface (API) server.

* * * * *